(12) United States Patent
Keys, Jr.

(10) Patent No.: US 11,866,927 B2
(45) Date of Patent: Jan. 9, 2024

(54) MULTI-PANEL FOLDABLE SHELTER SYSTEM

(71) Applicant: Ira R Keys, Jr., Tijeras, NM (US)

(72) Inventor: Ira R Keys, Jr., Tijeras, NM (US)

(*) Notice: Subject to any disclaimer, the term of this patent is extended or adjusted under 35 U.S.C. 154(b) by 0 days.

(21) Appl. No.: 17/957,618

(22) Filed: Sep. 30, 2022

(65) Prior Publication Data
US 2023/0374774 A1 Nov. 23, 2023

Related U.S. Application Data

(60) Provisional application No. 63/344,241, filed on May 20, 2022.

(51) Int. Cl.
| | |
|---|---|
| *E04B 1/344* | (2006.01) |
| *E04B 1/343* | (2006.01) |
| *H02S 20/23* | (2014.01) |
| *E04H 9/16* | (2006.01) |
| *E04H 9/04* | (2006.01) |
| *E04H 9/00* | (2006.01) |
| *E04H 9/14* | (2006.01) |

(52) U.S. Cl.
CPC .......... *E04B 1/3445* (2013.01); *E04B 1/344* (2013.01); *E04B 1/34384* (2013.01); *E04H 9/00* (2013.01); *E04H 9/04* (2013.01); *E04H 9/14* (2013.01); *E04H 9/16* (2013.01); *H02S 20/23* (2014.12); *E04B 1/34317* (2023.08)

(58) Field of Classification Search
CPC .... E04B 1/3445; E04B 1/34384; E04B 1/344; E04B 2001/34389; E04H 9/00; E04H 9/04; E04H 9/14; E04H 9/16; H02S 20/23
See application file for complete search history.

(56) References Cited

U.S. PATENT DOCUMENTS

| | | | | |
|---|---|---|---|---|
| 3,231,942 A | * | 2/1966 | O'Brien | A63H 33/008 |
| | | | | 446/478 |
| 3,984,949 A | * | 10/1976 | Wahlquist | E04B 1/3445 |
| | | | | 52/143 |
| 4,380,836 A | * | 4/1983 | Braxton | E04B 1/3445 |
| | | | | D25/16 |
| 5,493,818 A | * | 2/1996 | Wilson | E04B 1/3445 |
| | | | | 52/79.5 |

(Continued)

FOREIGN PATENT DOCUMENTS

| | | | | | |
|---|---|---|---|---|---|
| GB | 2225358 A | * | 5/1990 | ........... | E04B 1/3445 |
| GB | 2425547 A | * | 11/2006 | ........... | E04B 1/3445 |

*Primary Examiner* — Jessie T Fonseca
(74) *Attorney, Agent, or Firm* — Ortiz & Lopez, PLLC; Luis M. Ortiz; Kermit D. Lopez

(57) ABSTRACT

A compactable and portable shelter can include side panels, front and rear panels roof panels and a spine panel that are hingedly connected by continuous hinges in a manner that enables the panels to collapse onto each other and into a small profile unit for ease of transport, deployment and recovery. A window and door can be formed in at least one front or rear wall panel. Support brackets can hold wall panels upright at ninety degrees with respect to floor panels. A solar power system can provide electrical power for lighting and electronic device charging to occupants of the shelter. Adjustable legs connected at exterior corners of the base can level the left base flow panel and the right base floor panel. Panels can be thermally insulated.

20 Claims, 7 Drawing Sheets

(56) References Cited

U.S. PATENT DOCUMENTS

| | | | | |
|---|---|---|---|---|
| 5,950,568 | A | * | 9/1999 | Axelrod ................. A01K 1/033 |
| | | | | 119/499 |
| 10,206,501 | B1 | * | 2/2019 | Kindred, Jr. .......... E04B 1/3445 |
| 2005/0145192 | A1 | * | 7/2005 | Axelrod ............... A01K 1/0245 |
| | | | | 119/499 |
| 2008/0121188 | A1 | * | 5/2008 | Axelrod ................. A01K 1/033 |
| | | | | 119/499 |
| 2010/0025397 | A1 | * | 2/2010 | Krohn .................. B65D 88/522 |
| | | | | 220/6 |
| 2012/0186166 | A1 | * | 7/2012 | Casto ................... E04B 1/3445 |
| | | | | 29/897.3 |
| 2012/0317898 | A1 | * | 12/2012 | Strachan ............ E04B 1/34336 |
| | | | | 52/79.5 |
| 2013/0139449 | A1 | * | 6/2013 | Ho ......................... E04H 1/125 |
| | | | | 52/71 |
| 2021/0404170 | A1 | * | 12/2021 | Hariri ................ E04B 1/34363 |

* cited by examiner

MULTI-PANEL FOLDABLE SHELTER SYSTEM

INVENTION PRIORITY

The present application is a continuation of U.S. Provisional Patent Application No. 63/344,241, filed May 20, 2022, and entitled "Multi-Panel Foldable Shelter System", which is hereby incorporated by reference in its entirety.

TECHNICAL FIELD

The present invention generally relates to improvements in portable sheltering systems, and more particularly to the multi-panel foldable sheltering system.

BACKGROUND

Access to shelters is becoming increasingly necessary with an exploding human population, immigration, an increase in natural disasters, and military conflict. Shelters can be used to house private citizens but can also be used as a staging area for relief workers and the military. Shelters can also be useful for recreational purposes, such as hunting or camping.

Shelters presented have been presented in the past that have sides and ends that are hinged and collapses into a flat pack. However, because of the large size of the flat pack the shelter cannot be efficiently handled or transported to where it will be deployed for use nor can it be interconnected with other shelters. Furthermore, known portable shelters have no insulating properties or other features of utility that could aide in more usefulness of a portable and transportable shelter.

What is needed is a sheltering system that can be folded by collapsing multiple panels into a more compact, transportable unit, yet also being easily deployed when there is a need for its use in the field.

SUMMARY OF THE EMBODIMENTS

It is therefore a feature of the present invention is to provide a sheltering system that can function as a stand-alone unit or can be interconnected with other like shelters to build a community of shelters. There is a need for a sheltering system wherein each of the walls, flooring and roofing can be folded more than one time to achieve a compact, transportable profile, where all sides, flooring and roofing are hingedly connected in order to maintain system integrity.

In accordance with the embodiments, there is also provided an individual shelter with features such as adjustable legs, hinged floor insulated panels, lower hinged side insulated panels, hinged upper side insulated panels, hinged roof sections, hinged insulated spine panel, continuous roof membrane from floor to insulated spine panel to floor, hinged end sections, hinged door, hinged window, solar panel with battery pack, LED lighting with an on/off/dimmer switch, electronic accessory charging ports.

In accordance with the embodiments, there is also provided an individual shelter with spring-loaded clips retaining the right front end insulated wall panels that can be released and the right front end insulated wall panel can be folded toward the inside of the shelter via continuous hinge connecting the right front end insulated wall panel and the left front end insulated wall panel so the inward side of the right front end insulated wall panel ultimately rests against the inward side of the left front end insulated wall panel. The spring-loaded clips retaining the left rear end insulated wall panel can be released and the left rear end insulated wall panel can be folded toward the inside of the shelter via continuous hinge connecting the left rear end insulated wall panel and the right rear end insulated wall panel so the inward side of the left rear end insulated wall panel ultimately rests against the inward side of the right rear end insulated wall panel.

Further, in accordance with the embodiments, it is a feature that the combined right front end insulated wall panel and the left front end insulated wall panel can fold toward the left insulated floor panel via continuous hinge connecting the left front end insulated wall panel and the left insulated floor panel. Then the combined left rear end insulated wall panel and the right rear end insulated wall panel can fold toward the right insulated floor panel via a continuous hinge connecting the right rear end insulated panel and the right insulated floor panel.

Further, in accordance with the embodiments, it is a feature that the left side vertical lock arms attached to the left floor insulated panel and the lower left insulated wall panel can be released allowing the lower left insulated wall panel to rotate toward the inside of the shelter via continuous hinge connecting the lower left insulated wall panel to the left insulated floor panel while the continuous hinge connecting the lower left insulated wall panel to the upper left insulated wall panel allows the bottom of the upper left insulated wall panel to rotate toward the inside of the shelter while the continuous hinge connecting the upper left insulated wall panel to the left side of the left insulated roof panel allows the left insulated roof panel to rotate downward toward the left insulated floor panel while the continuous hinge connecting the right side of the left insulated roof panel to the insulated spine panel allows the insulated spine panel to follow the track of the left insulated roof panel.

Further, in accordance with the embodiments, it is a feature that the right side vertical lock arms attached to the right insulated floor panel and the lower right insulated wall panel can be released allowing the lower right insulated wall panel to rotate toward the inside of the shelter via continuous hinge connecting the lower right insulated wall panel to the right insulated floor panel while the continuous hinge connecting the lower right insulated wall panel to the upper right insulated wall panel allows the bottom of the upper right insulated wall panel to rotate toward the inside of the shelter while the continuous hinge connecting the upper right insulated wall panel to the right side of the right insulated roof panel allows the right insulated roof panel to rotate downward toward the right insulated floor panel while the continuous hinge connecting the left side of the right insulated roof panel to the insulated spine panel allows the insulated spine panel to follow the track of the right insulated roof panel. Thus, the front and rear end insulated panels, left and right side insulated panels, left and right insulated roof panels and the insulated spine panel can fold to the floor to create a semi triangular structure.

Further, in accordance with the embodiments, it is a feature that the left insulated floor panel and the right insulated floor panel can fold upward via continuous hinge attaching the left insulated floor panel and the right insulated floor panel bringing with both sides of previous folded insulated panels so that all side panels, end panels, roof panels and floor panels rest side by side in a compact configuration.

Further, in accordance with the embodiments, it is a feature that individual shelter can be connected together side-by-side during deployment of each individual shelter to form a plurality of shelters interconnected in a row.

Further, in accordance with the embodiments, it is a feature that individual shelter can be connected together back-to-back during deployment of each individual shelter to form a combination of at least two shelters interconnected one behind the other.

Further, in accordance with the embodiments, it is a feature that individual shelter can be connected together side-by-side and back-to-back during deployment of each individual shelter to form a plurality of shelters interconnected in at least two rows.

Further, in accordance with the embodiments, it is a feature that individual shelter can be connected together side-by-side in a first row, and side-by-side in a second row behind the first row, and a common and enclosed passageway can connect the first row with the second row, wherein the passageway enables common usage and entry for occupants of the first and second rows via doorways of each shelter facing the common and enclosed passageway.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENTS

A detailed description will now be provided. Each of the appended claims defines a distinct embodiment of the invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. Each of the embodiments will now be described in greater detail below, including specific embodiments, versions and examples, but the inventions are not limited to these embodiments, versions or examples, which are included to enable a person having ordinary skill in the art to make and use the inventions when the information in this patent is combined with available information and technology. Reference to the term "hingedly" refers to the connection of an end of a panel to either another panel or a floor by a hinge, or the like. When referring to a roof panel, the term "roof panel" or "roof" should also be broadly interpreted to include a cover, whether the cover is represented by one or two panels, given the scalability of the housing described with respect to the various embodiment. A "housing" as referred to herein can be as large as an aviation hanger down to the housing of a small shed. Teaching of a "housing" and some of its aspects as described herein are not meant to be limited.

Figure 1:
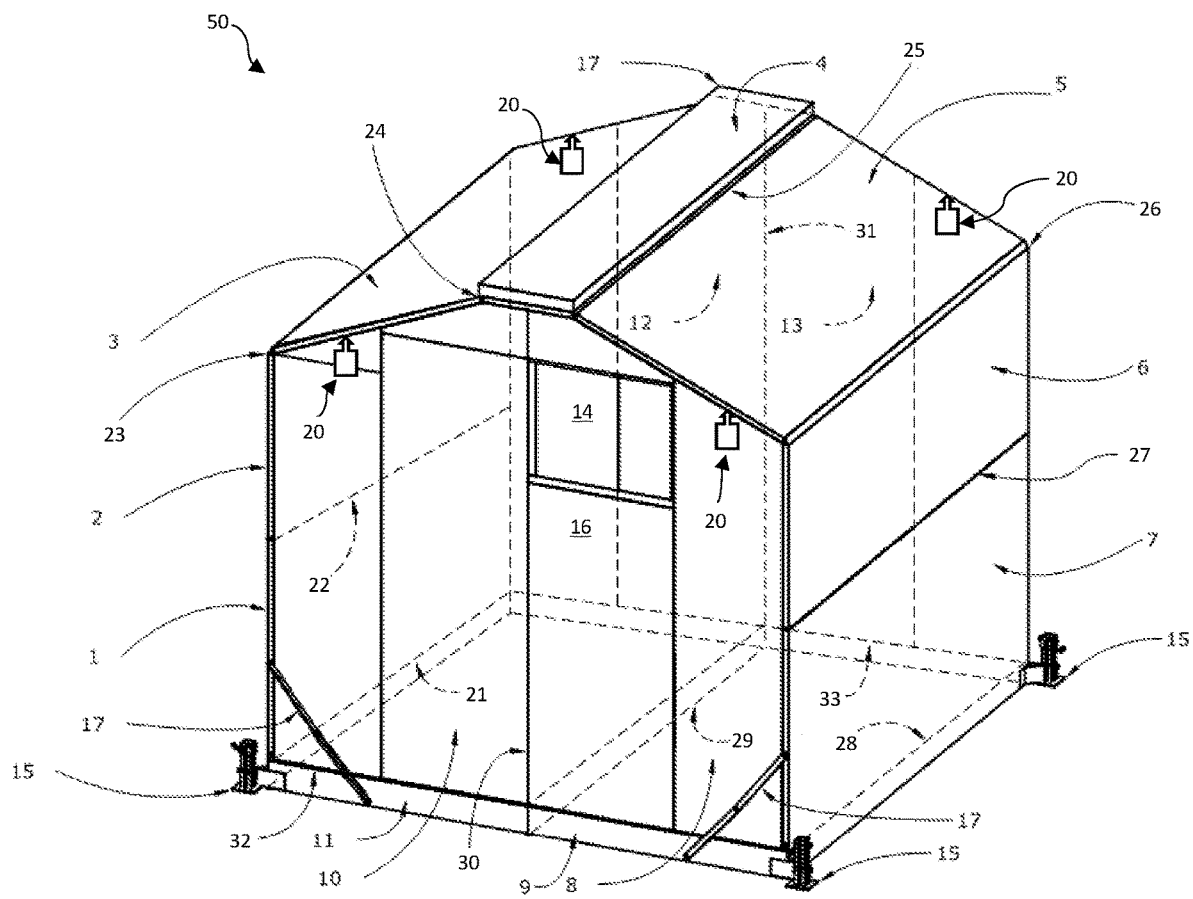
FIG. 1 is a front, right, top perspective view of the portable shelter exhibiting the following features all panels fully deployed.

Referring to FIG. 1, illustrated is a shelter 50 in a full deployed state, in accordance with the embodiments. The shelter 50 can be provided with a left base floor panel 11 connected by first continuous hinge 29 to a right base floor panel 9. Left base floor panel 11 and right base floor panels 9 provide the complete floor space for the shelter 50. Adjustable legs 15 can be attached to opposing corners of the left base floor panel 11 and right base floor panels 9. Adjustable legs 15 can enable leveling of the left base floor panel 11 and right base floor panels 9, and thereby also the shelter 50. Attached to the left base floor panel 11 via tenth continuous hinge 32 is the left front end wall panel 10. Attached to the left front end wall panel 10 via first vertical continuous hinge 30 is the right front end wall panel 8. Attached to the right base floor panel 9 via eleventh continuous hinge 33 is the right rear end wall panel 13. Attached to the right rear end wall panel 13 via second vertical continuous hinge 31 is the left rear wall panel 12. Windows can be formed in front and rear panels, such as window 14 shown formed in the right front end wall panel 8. Doors can also be formed in the front and rear panels, such as door 16 shown formed in the left front end wall panel 10.

Spring-loaded clips 20 can be provided on the left front end wall panel 10, right front end wall panel 8, left rear wall panel 12 and right rear end panel 13 to retain them in vertical upright positions by facilitating their connection to at least one of left roof panel 3, right roof panel 5, lower left side panel 1, upper left wall panel 2, lower right side panel 7, and upper right side panel 6. When collapsing the shelter, the spring-loaded clips 20 can be released on the right front end wall panel 8 and the right front end wall panel 8 can be rotated in towards the inside of the shelter 50 via continuous hinge 30 connecting the left front end wall panel 10 and the right front end wall panel 8 so the inward side of the right front end wall panel 8 ultimately rests against the inward side of the left front end wall panel 10. Similarly, the spring-loaded clips 20 retaining the left rear end insulated wall panel 12 can be released and the left rear end wall panel 12 can be rotated in towards the inside of the shelter 50 via continuous hinge 31 connecting the left rear end wall panel 12 and the right rear end wall panel 13 so the inward side of the left rear end wall panel 12 ultimately rests against the inward side of the right rear end wall panel 13.

Still referring to FIG. 1, lower left wall panel 1 can be hingedly attached via second continuous hinge 21 to left base floor panel 11. Upper left wall panel 2 can be hingedly attached via third continuous hinge 22 to lower left wall panel 1. Left roof panel 3 can be hingedly attached via fourth continuous hinge 23 to upper left wall panel 2. Spine panel 4 can be hingedly attached via fifth continuous hinge 24 to left roof panel 3. Right roof panel 5 can be hingedly attached via sixth continuous hinge 25 to spine panel 4. Upper right wall panel 6 can be hingedly attached via seventh continuous hinge 26 to right roof panel 5. Lower right wall panel 7 can be hingedly attached via eight continuous hinge 27 to upper right wall panel 6. Lower right wall panel 7 can be hingedly attached via ninth continuous hinge 28 to right base floor panel 9.

Support brackets 17/18 can be connected at each corner of the shelter 50 to maintain it in its fully deployed state where lower left wall panel 1 (and thereby upper left wall panel 2) can be held vertically upright (at 90 degrees with respect to left base floor panel 11) by support bracket 17, when support bracket 17 can be locked straight with its connection between lower left wall panel 1 and left base floor panel 11, and lower right wall panel 7 (and thereby upper right wall panel 6) can be held vertically upright (at 90 degrees with respect to right base floor panel 9) by support bracket 18, when support bracket 18 is locked straight with its connection between lower right panel 7 and right base floor panel 9. Similar bracket (although not shown) can connect lower left wall panel 1 and left base floor panel 11, and lower right panel 7 and right base floor panel 9, at the rear of the shelter 50.

Figure 2:
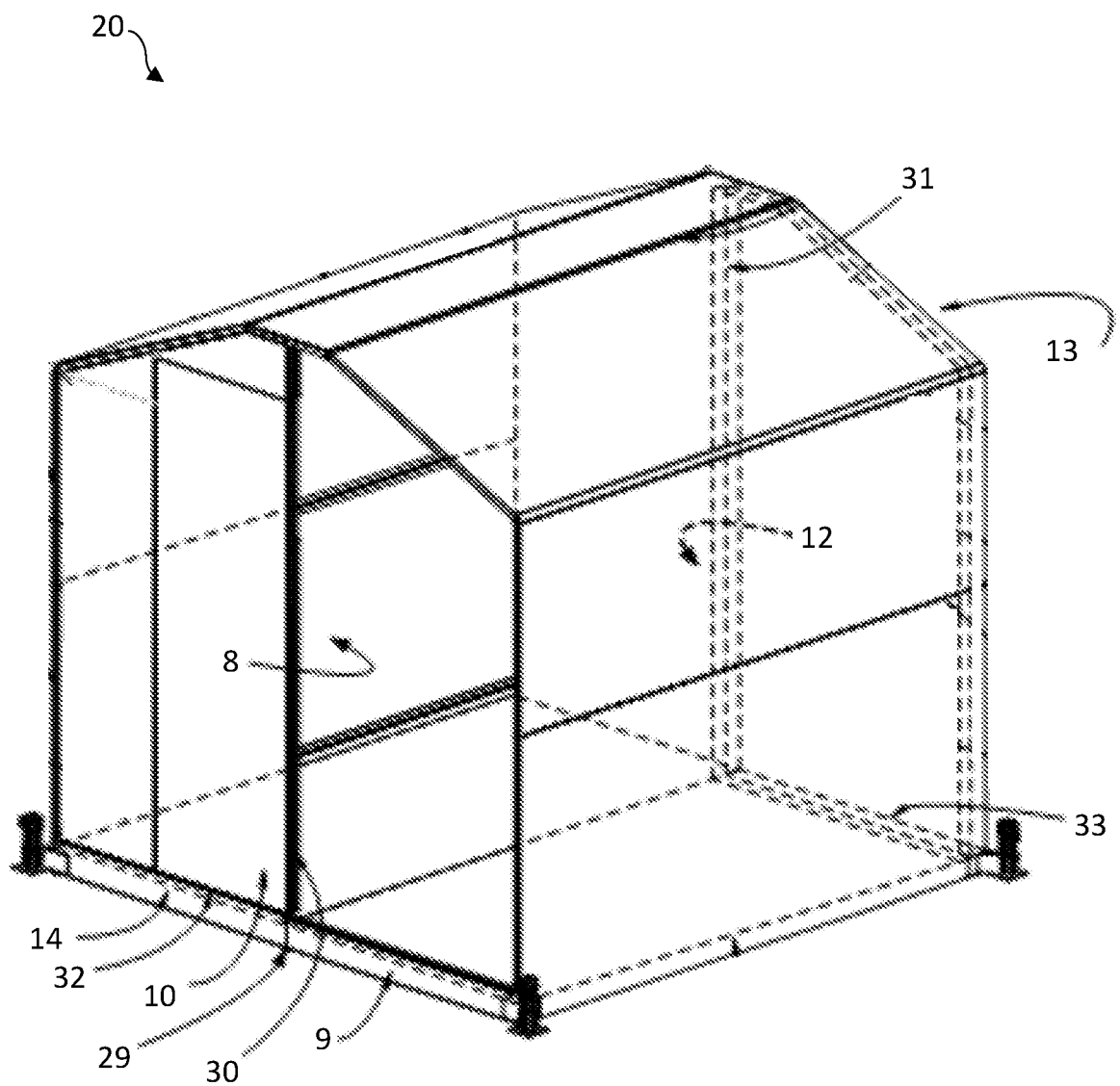
FIG. 2 is another front, right, top perspective view of the shelter of FIG. 1 with the front and rear doors shown opened inside and resting against the back surface of each of their respective panels.
Figure 5:
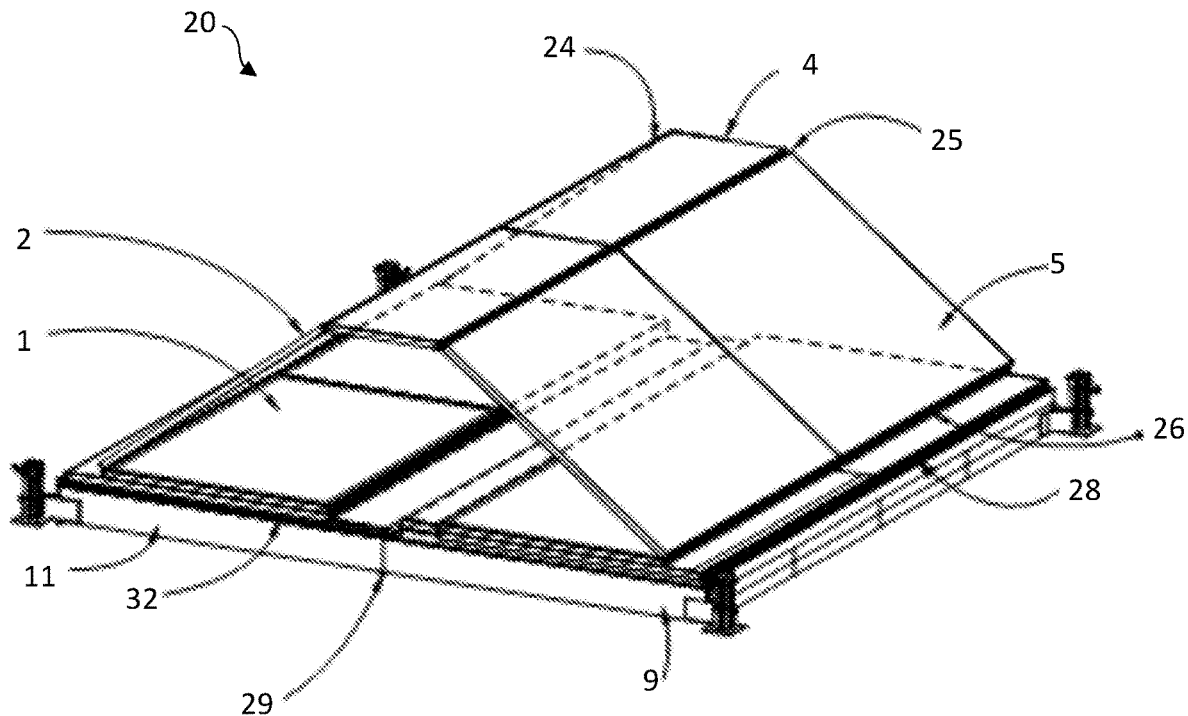
FIG. 5 is a front, right, top perspective view of the shelter of FIG. 4 with the sides being shown fully folded in half and resting against the ends on top of the floor.
Figure 6:
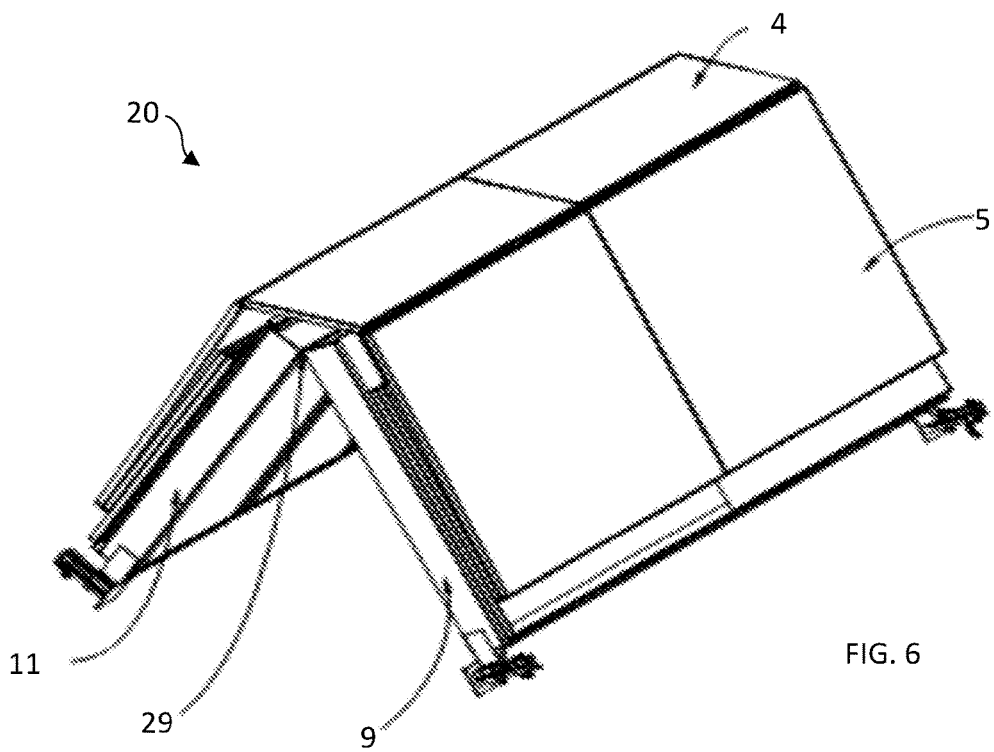
FIG. 6 is a front, right, top perspective view of the shelter of FIG. 5 with the floor, ends and sides shown folding upward into the roof.
Figure 7:
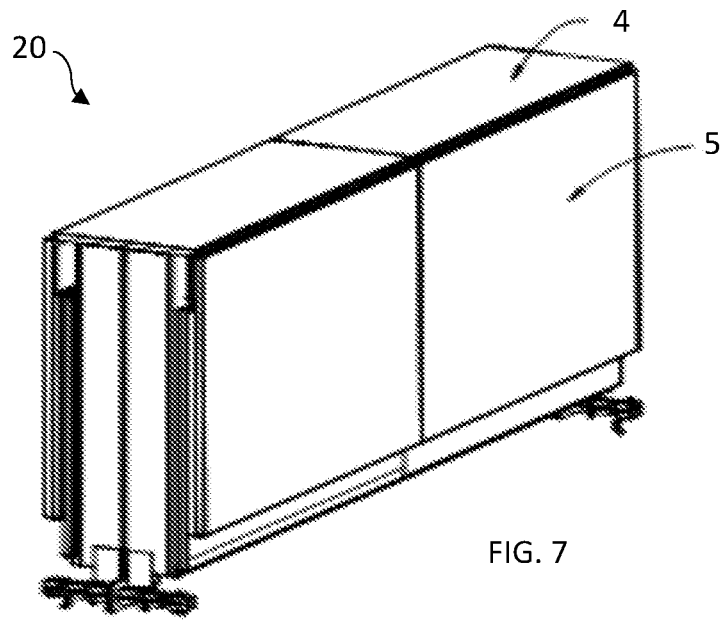
FIG. 7 is a front, right, top perspective view of the shelter of FIGS. 1-6, with the shelter shown completely folded into a transportable, portable unit.

Referring now to FIGS. 2 through 7, illustrated are initial steps that can be taken in recovering the fully deployed shelter 50 into a compact and transportable unit as shown in FIG. 7. Referring to FIG. 2, right front end wall panel 8 can be released via spring-loaded clip 20 and then rotated inward at first vertical continuous hinge 30 until it comes to rest against left front end wall panel 10, and left rear wall panel 12 can be released via spring-loaded clip 20 and rotated inward at second vertical continuous hinge 31 until it comes to rest against right rear end wall panel 13.

Figure 3:
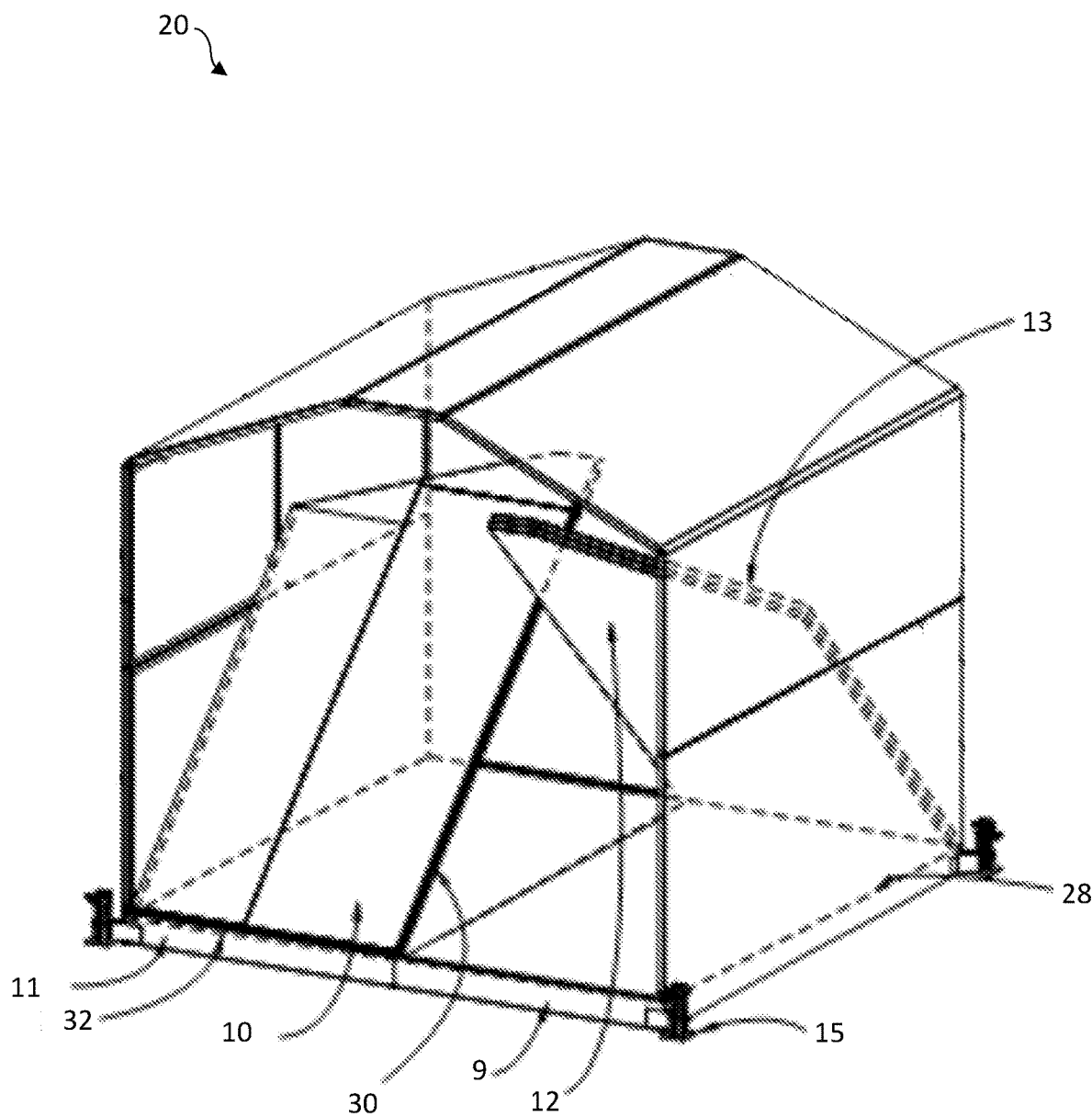
FIG. 3 is a front, right, top perspective view of the shelter of FIG. 2 with the ends shown being folded towards the floor.

Referring to FIG. 3, Right front end wall panel 8 and left front end wall panel 10 (now against each other) are can then be rotated inward and downward at tenth continuous hinge 32 until they come to rest on left base floor panel 11, and left rear wall panel 12 right rear end wall panel 13 (now against each other) can be rotated inward and downward at eleventh continuous hinge 33 until they come to rest on right base floor panel 9.

Figure 4:
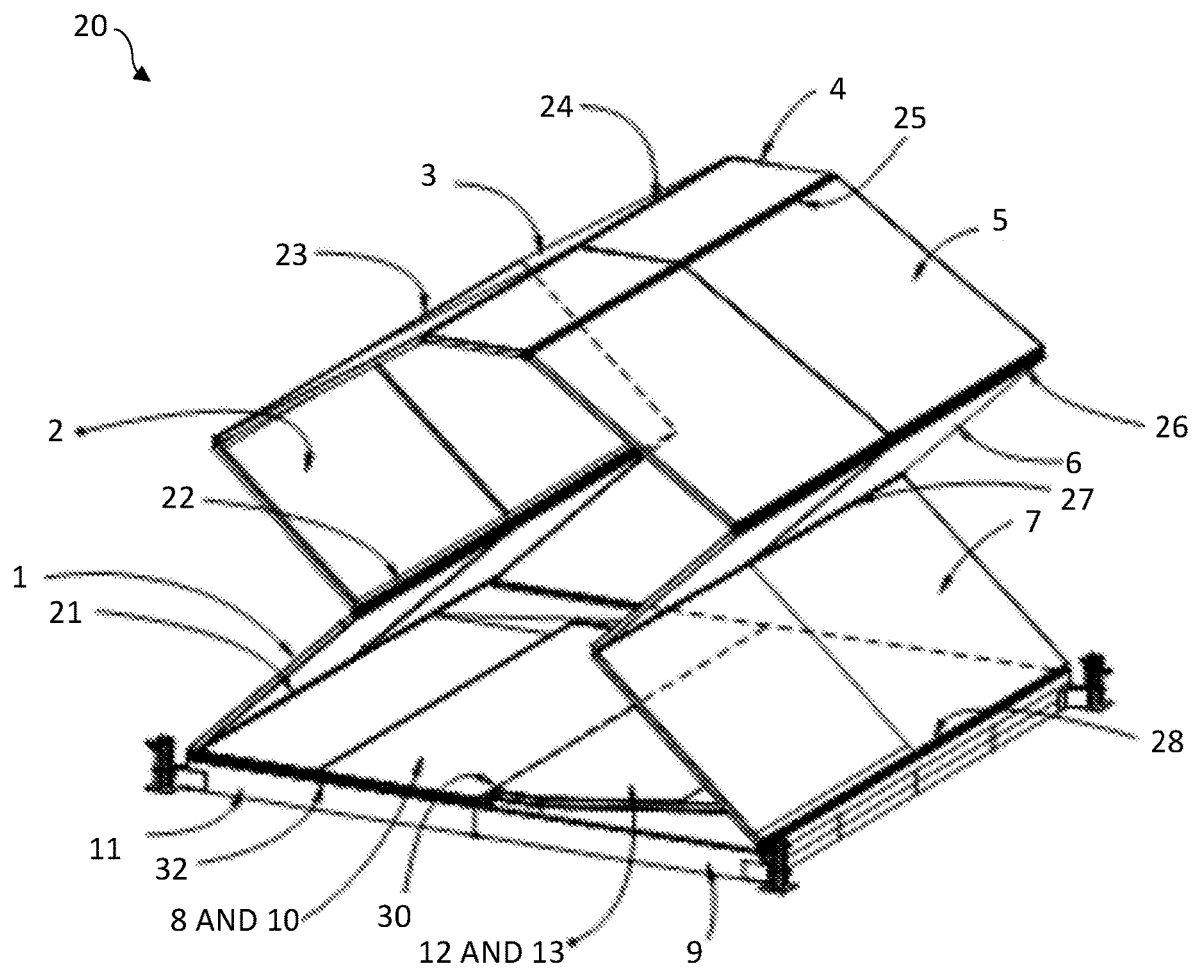
FIG. 4 is a front, right, top perspective view of the shelter of FIG. 3 with the sides being shown folding in half and moving downward towards the floor together with the roof that is hingedly attached to the sides.

Referring to FIG. 4, support brackets 17 and 18 can be unlocked and then lower left wall panel 1 can be rotated inward and downward at second continuous hinge 21 towards left base floor panel 11 as lower right wall panel 7 is simultaneously rotated inward and downward at ninth continuous hinge 28 towards right base floor panel 9. Upper left wall panel 2 rotates outward and downward at third continuous hinge 22 to rest against lower left wall panel 1 as it is moved, and upper right wall panel 6 rotates outward and downward at eighth continuous hinge 27 to rest against lower right wall panel 7 as it is moved. Left roof panel 3 moves downward at fourth continuous hinge 23 with downward movement upper left wall panel 2, while right roof panel 5 moves downward at seventh continuous hinge 26 with downward movement of upper right wall panel 6. Spine panel 4 moves downward with movement downward of left roof panel 3 and right roof panel 5. Referring to FIG. 5, illustrated is the completion rotation of lower left wall panel 1 and upper left wall panel 2 onto a resting position over left base floor panel 11, and lower right wall panel 7 and upper right wall panel 6 onto a resting position over right base floor panel 9, with left roof panel 3 and right roof panel 5 maintaining their pitch with respect to spine panel 4.

Referring to FIGS. 6 and 7, illustrated is simultaneous upward rotation of left base panel 11 and right base panel 9 (together with panels being supported by left base panel 11 and right base panel 9) along first continuous hinges 29, fourth continuous hinge 23, and seventh continuous hinge 26 towards spine panel 4 while left roof panel 3 rotates along fifth continuous hinge 24 and right roof panel 5 rotates along sixth continuous hinge 25 toward each other under spine panel 4 resulting in containment therebetween of upper left wall panel 2, lower left wall panel 1, left front end wall panel 10, right front end wall panel 8, left base floor panel 11, right base floor panel 9, left rear wall panel 12, right rear end wall panel 13, lower right wall panel 7, and upper right wall panel 6. FIG. 7 illustrates complete recovery of the shelter 50 into a compact, transportable unit.

It should be appreciated that to deploy shelter 50 for its use would generally entail reversal of the steps described with respect to FIGS. 2-7. Left base panel 11 and right base panel 9 are simultaneously rotated outward along first continuous hinge 29, fourth continuous hinge 23, and seventh continuous hinge 26, and away from spine panel 4 while left roof panel 3 rotates along fifth continuous hinge 24 and right roof panel rotate along sixth continuous hinge 25 away from each other under spine panel 4, resulting in left roof panel 3 and right roof panel 5 being placed into a pitch with respect to spine panel 4 and left base panel 11 and right base panel 9 laying horizontally and next to each other while connected by first continuous hinge 29. Raising spine panel 4, left roof panel 3 and right roof panel 5 upward and away from left base panel 11 and right base panel 9 thereby causing lower left wall panel 1 to rotate upward and away from left base panel 11 at second continuous hinge 21, upper left wall panel 2 to rotate upward and away from lower left wall panel 1 at third continuous hinge 22 and fourth continuous hinge 23 and lower right wall panel 7 to rotate upward and away from right base panel 9 at ninth continuous hinge 28, and upper right wall panel 6 to rotate upward and away from lower right wall panel 7 at eight continuous hinge 27 and seventh continuous hinge 26. Locking support bracket 17 straight between lower left wall panel 1 and left base floor panel 11 resulting in lower left wall panel 1 (and thereby upper left wall panel 2) being deployed upward at ninety degrees with respect to left base floor panel 11, and locking support bracket 18 straight between lower right wall panel 7 and right base floor panel 9 resulting in lower right wall panel 7 (and thereby upper right wall panel 6) being deployed upward at ninety degrees with respect to right floor panel 9.

Right front end wall panel 8 and left front end wall panel 10 are rotated upward and outward at tenth continuous hinge 32 until they are upright at ninety degrees with respect to left base floor panel 11, and left rear wall panel 12 and right rear end wall panel 13 are rotated upward and outward at eleventh continuous hinge 33 until they are upright at ninety degrees with respect to right base floor panel 9. Left front end wall panel 10 and right rear end wall panel 13 are locked in place to any of the wide panels or roof panels by spring-loaded clips 20. Right front end wall panel 8 is rotated at first vertical continuous hinge 30 outward and away from left front end wall panel 10, and left rear wall panel 12 is rotated at second vertical continuous hinge 31 outward and away from right rear end wall panel 13. Right front end wall panel 8, left front end wall panel 10, right rear end wall panel 13 and left rear wall panel 12 are secured in their upright position to any of left roof panel 3, right roof panel 5, lower left wall panel 1, upper left wall panel 2, lower right wall panel 7, and/or upper right wall panel 6 by spring-loaded clips 20. The shelter 50 can then be leveled by the adjustable legs 15 located at each its corners.

Figure 8:
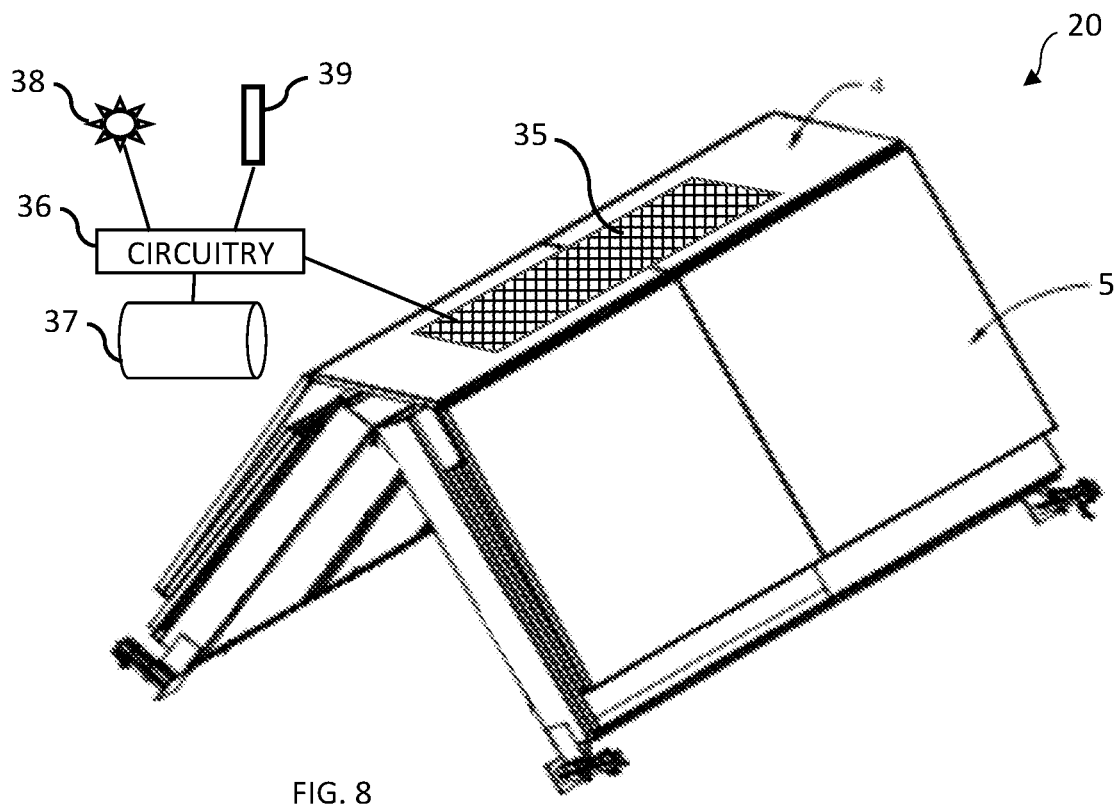
FIG. 8 is a front, right, top perspective view of the shelter of FIGS. 1-6, with the shelter shown including a solar power system on the ridge of the shelter's roof.

A solar panel can be mounted or integrated within any of the left roof panel 3, right roof panel 5 or spine 4. Referring to FIG. 8, illustrated is the spine 4 of shelter 50 including solar power element 35 thereon. Spine 4 can include electronic circuitry 36 and battery storage 37 integrated therein that would be necessary to manage energy produced by solar element 35. Electrical power can then be utilized for switch controlled lighting 38 (e.g., on/off/dimmable) and USB charging ports 39 for use by occupants of the shelter 50.

Figure 9:
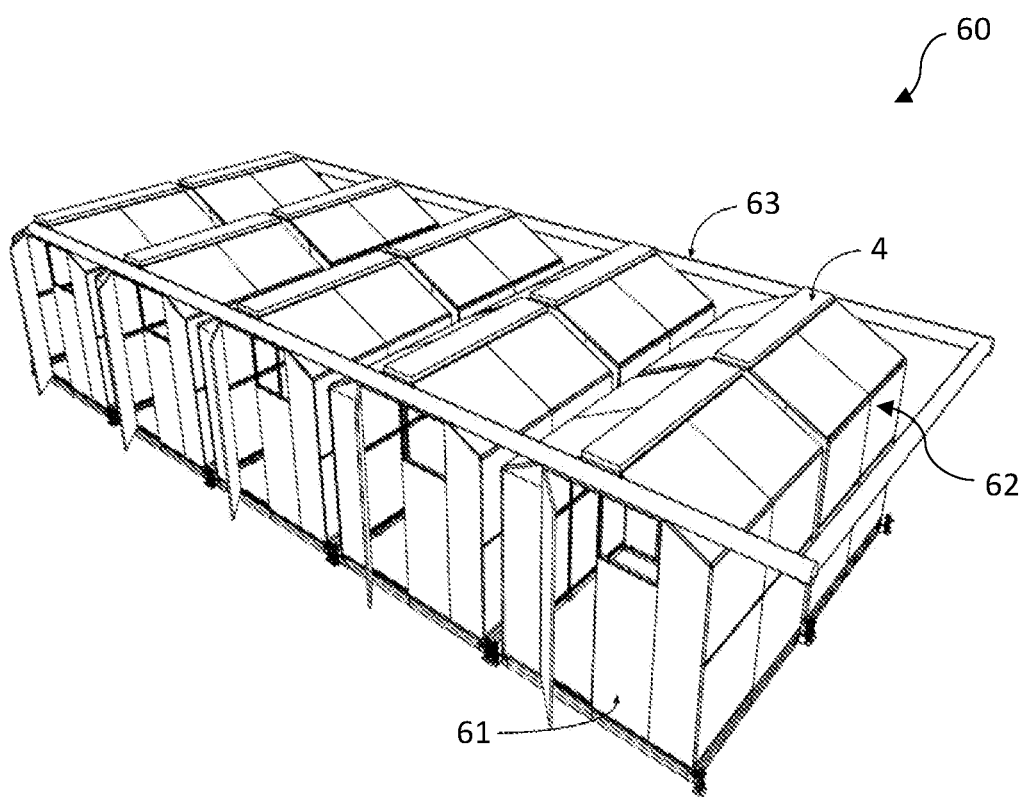
FIG. 9 is a front, right, top perspective view of a plurality of individual shelters shown assembled side-by-side and in two rows back-to-back.

Referring to FIG. 9, it can be appreciated that solar systems from more than one shelter can be tied together to generate power for a community of shelters. FIG. 9 illustrates a community of shelters 60 wherein a first row 61 of more than one shelter can be deployed and connected side-by-side, and a second row 62 of shelters can be deployed behind and connected to the first row 61 of shelters. Conduit 63 can contain wiring from ridge 4 mounted solar systems of each of the shelters in a shared solar power system.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art. As used herein in the claim(s), when used in conjunction with the word "comprising", the words "a" or "an" mean one or more.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A shelter, comprising:
   a left base floor panel hingedly connected by a first continuous hinge to a right base floor panel, wherein the left base floor panel and the right base floor panel provide complete floor space for the shelter;
   a lower left wall panel hingedly connected by a second continuous hinge to the left base floor panel;
   an upper left wall panel hingedly connected by a third continuous hinge to the lower left wall panel;
   a left roof panel hingedly connected by a fourth continuous hinge to the upper left wall panel;
   a spine panel hingedly connected by a fifth continuous hinge to the left roof panel;
   a right roof panel hingedly connected by a sixth continuous hinge to the spine panel;
   an upper right wall panel hingedly connected by a seventh continuous hinge to the right roof panel;
   a lower right wall panel hingedly connected by an eighth continuous hinge to the upper right wall panel and is further hingedly connected by a ninth continuous hinge to the right base floor panel;
   a left front end wall panel hingedly connected to the left base floor panel by a tenth continuous hinge;
   a right front end wall panel hingedly connected by a first vertical continuous hinge to the left front end wall panel;
   a right rear end wall panel hingedly connected to the right base floor panel by an eleventh continuous hinge; and
   a left rear wall panel hingedly connected by a second vertical continuous hinge to the right rear end wall panel.

2. The shelter of claim 1, further comprising at least one window formed in at least one of the right front end wall panel, the left front end wall panel, the right rear end wall panel or the left rear end wall panel.

3. The shelter of claim 1, further comprising at least one door formed in at least one of the right front end wall panel, the left front end wall panel, the right rear end wall panel or the left rear end wall panel.

4. The shelter of claim 1, further comprising a first support bracket connecting the left base floor panel to the lower left wall panel and a second support bracket connecting the right base floor panel to the lower right wall panel, wherein the first and second support brackets hold the lower left wall panel and lower right wall panel upright at ninety degrees with respect to the left base floor panel and the right base floor panel.

5. The shelter of claim 1, further comprising a solar power system including a solar element integrated within at least one of the spine panel, the left roof panel or the right roof panel, wherein the solar power system provides electrical power for lighting and electronic device charging to occupants of the shelter.

6. The shelter of claim 1, further comprising adjustable legs connected at exterior corners of the left base flow panel and the right base floor panel, said adjustable legs adapted to level the left base floor panel and the right base floor panel.

7. The shelter of claim 1, wherein the lower left wall panel, the upper left wall panel, the left roof panel, the spine panel, the right roof panel, the lower right wall panel, the left front end wall panel, the right front end wall panel, the right rear end wall panel, and the left rear wall panel are thermally insulated.

8. The shelter of claim 1, further comprising spring-loaded clips for securing the left front end wall panel, the right front end wall panel, the right rear end wall panel and the left rear wall panel to at least one of the side wall panels or the roof panels.

9. A shelter, comprising:
   a left base floor panel hingedly connected by a first continuous hinge to a right base floor panel, wherein the left base floor panel and right base floor panel provide complete floor space for the shelter;
   a lower left wall panel hingedly connected by a second continuous hinge to left base floor panel;
   an upper left wall panel hingedly connected by a third continuous hinge to the lower left wall panel;
   a left roof panel hingedly connected by a fourth continuous hinge to the upper left wall panel;

a spine panel hingedly connected by a fifth continuous hinge to the left roof panel;
a right roof panel hingedly connected by a sixth continuous hinge to the spine panel;
an upper right wall panel hingedly connected by a seventh continuous hinge to the right roof panel;
a lower right wall panel hingedly connected by an eighth continuous hinge to the upper right wall panel and is further hingedly connected by a ninth continuous hinge to the right base floor panel;
a left front end wall panel hingedly connected to the left base floor panel by a tenth continuous hinge;
a right front end wall panel hingedly connected by a first vertical continuous hinge to the left front end wall panel;
a right rear end wall panel hingedly connected to the right base floor panel by an eleventh continuous hinge;
a left rear wall panel hingedly connected by a second vertical continuous hinge to the right rear end wall panel;
a first support bracket connecting the left base floor panel to the lower left wall panel and a second support bracket connecting the right base floor panel to the lower right wall panel, wherein the first and second support brackets hold the lower left wall panel and lower right wall panel upright at ninety degrees with respect to the left base floor panel and the right base floor panel;
spring-loaded clips adapted for securing the left front end wall panel, the right front end wall panel, the right rear end wall panel and the left rear wall panel to at least one of the side wall panels or the roof panels;
at least one window formed in at least one of the right front end wall panel, the left front end wall panel, the right rear end wall panel or the left rear end wall panel; and
at least one door formed in at least one of the right front end wall panel, the left front end wall panel, the right rear end wall panel or the left rear end wall panel.

10. The shelter of claim 9, further comprising a solar power system including a solar element integrated within at least one of the spine panel, left roof panel or the right roof panel, wherein the solar power system provides electrical power for lighting and electronic device charging to occupants of the shelter.

11. The shelter of claim 9, further comprising adjustable legs connected at exterior corners of the left base floor panel and the right base floor panel, said adjustable legs adapted to level the left base flow panel and the right base floor panel.

12. The shelter of claim 9, wherein the lower left wall panel, the upper left wall panel, the left roof panel, the spine panel, the right roof panel, the lower right wall panel, the left front end wall panel, the right front end wall panel, the right rear end wall panel, and the left rear wall panel are thermally insulated.

13. The shelter of claim 9, further comprising spring-loaded clips for securing the left front end wall panel, the right front end wall panel, the right rear end wall panel and the left rear wall panel to at least one of the side wall panels or the roof panels.

14. The shelter of claim 11, further comprising a solar power system including a solar element integrated within at least one of the spine panel, the left roof panel or the right roof panel, wherein the solar power system provides electrical power for lighting and electronic device charging to occupants of the shelter.

15. The shelter of claim 10, further comprising adjustable legs connected at exterior corners of the left base flow panel and the right base floor panel, said adjustable legs adapted to level the left base floor panel and the right base floor panel.

16. The shelter of claim 10, wherein the lower left wall panel, the upper left wall panel, the left roof panel, the spine panel, the right roof panel, the lower right wall panel, the left front end wall panel, the right front end wall panel, the right rear end wall panel, and the left rear wall panel are thermally insulated.

17. The shelter of claim 11, wherein the lower left wall panel, the upper left wall panel, the left roof panel, the spine panel, the right roof panel, the lower right wall panel, the left front end wall panel, the right front end wall panel, the right rear end wall panel, and the left rear wall panel are thermally insulated.

18. The shelter of claim 14, wherein the lower left wall panel, the upper left wall panel, the left roof panel, the spine panel, the right roof panel, the lower right wall panel, the left front end wall panel, the right front end wall panel, the right rear end wall panel, and the left rear wall panel are thermally insulated.

19. A method for deploying a portable shelter, comprising:
providing a shelter including:
a left base floor panel hingedly connected by a first continuous hinge to a right base floor panel, wherein the left base floor panel and right base floor panel provide complete floor space for the shelter;
a lower left wall panel hingedly connected by a second continuous hinge to left base floor panel;
an upper left wall panel hingedly connected by a third continuous hinge to the lower left wall panel;
a left roof panel hingedly connected by a fourth continuous hinge to the upper left wall panel;
a spine panel hingedly connected by a fifth continuous hinge to the left roof panel;
a right roof panel hingedly connected by a sixth continuous hinge to the spine panel;
an upper right wall panel hingedly connected by a seventh continuous hinge to the right roof panel;
a lower right wall panel hingedly connected by an eighth continuous hinge to the upper right wall panel and is further hingedly connected by a ninth continuous hinge to the right base floor panel;
a left front end wall panel hingedly connected to the left base floor panel by a tenth continuous hinge;
a right front end wall panel hingedly connected by a first vertical continuous hinge to the left front end wall panel;
a right rear end wall panel hingedly connected to the right base floor panel by an eleventh continuous hinge; and
a left rear end wall panel hingedly connected by a second vertical continuous hinge to the right rear end wall panel;
a first support bracket adapted for connecting the left base floor panel to the lower left wall panel and a second support bracket adapted for connecting the right base floor panel to the lower right wall panel;
spring-loaded clips adapted for securing the left front end wall panel, the right front end wall panel, the right rear end wall panel and the left rear wall panel to at least one of the side wall panels or the roof panels; and
adjustable legs connected at exterior corners of the left base floor panel and the right base floor panel, said adjustable legs adapted to level the left base floor panel and the right base floor panel;

simultaneously rotate the left base floor panel and the right base floor panel outward along the first continuous hinge, the fourth continuous hinge, and the seventh continuous hinge, away from the spine panel while the left roof panel is rotated along the fifth continuous hinge and the right roof panel is rotated along the sixth continuous hinge away from each other under the spine panel, resulting in the left roof panel and the right roof panel being placed into a pitch with respect to the spine panel and the left base floor panel and the right base floor panel laying horizontally and next to each other while connected by the first continuous hinge;

raise the spine panel, the left roof panel and the right roof panel upward and away from the left base floor panel and the right base floor panel thereby causing the lower left wall panel to rotate upward and away from the left base floor panel at the second continuous hinge, the upper left wall panel to rotate upward and away from the lower left wall panel at the third continuous hinge and the fourth continuous hinge and the lower right wall panel to rotate upward and away from the right base floor panel at the ninth continuous hinge, and the upper right wall panel to rotate upward and away from the lower right wall panel at the eight continuous hinge and the seventh continuous hinge;

lock the first support bracket straight between the lower left wall panel and the left base floor panel resulting in the lower left wall panel, and thereby the upper left wall panel, being deployed upward at ninety degrees with respect to the left base floor panel, and lock the second support bracket straight between the lower right wall panel and the right base floor panel resulting in the lower right wall panel, and thereby the upper right wall panel, being deployed upward at ninety degrees with respect to the right floor panel, wherein the first and second support brackets hold the lower left wall panel and the lower right wall panel upright at ninety degrees with respect to the left base floor panel and the right base floor panel;

rotate the right front end wall panel and the left front end wall panel upward and outward at the tenth continuous hinge until they are upright at ninety degrees with respect to the left base floor panel, and rotate the left rear end wall panel and the right rear end wall panel upward and outward at the eleventh continuous hinge until they are upright at ninety degrees with respect to the right base floor panel;

lock the left front end wall panel and the right rear end wall panel in place to at least one of the wall panels or the roof panels with the spring-loaded clips;

rotate the right front end wall panel at the first vertical continuous hinge outward and away from the left front end wall panel, and rotate the left rear wall panel at the second vertical continuous hinge outward and away from the right rear end wall panel;

secure the right front end wall panel and the left rear wall panel to at least one of the left roof panel, the right roof panel, the lower left wall panel, the upper left wall panel, the lower right wall panel, and/or the upper right wall panel with the spring-loaded clips; and level the shelter using the adjustable legs provided at each corner of the shelter defined by the left base floor panel and the right floor base panel.

20. The method of claim 19, further comprising steps for recovering the shelter after it use including:

release the right front end wall panel and the left rear end panel from their attachment to the at least one of the left roof panel, the right roof panel, the lower left wall panel, the upper left wall panel, the lower right wall panel, and/or the upper right wall panel via manipulation of the spring-loaded clips;

rotate the right front end wall panel inward at the first vertical continuous hinge until it comes to rest against the left front end wall panel, and rotate the left rear wall panel inward at the second vertical continuous hinge until it comes to rest against the right rear end wall panel;

rotate the left front end wall panel and the right front end wall panel resting against the left front end wall panel downward and inward at the tenth continuous hinge until they come to rest on the left base floor panel;

rotate the right rear end wall panel and the left rear end wall panel resting against the right rear end wall panel downward and inward at the eleventh continuous hinge until they come to rest on the right base floor panel;

unlock the first and second support brackets and then the lower left wall panel by rotating it inward and downward at the second continuous hinge towards left base floor panel as the lower right wall panel is simultaneously rotated inward and downward at the ninth continuous hinge towards the right base floor panel and the upper left wall panel rotates outward and downward at the third continuous hinge to rest against the lower left wall panel as it is moved and the upper right wall panel rotates outward and downward at the eighth continuous hinge to rest against the lower right wall panel as it is moved;

move the left roof panel downward at the fourth continuous hinge towards the upper left wall panel, while moving the right roof panel downward at the seventh continuous hinge towards the upper right wall panel, wherein the spine panel moves downward with downward movement of the left roof panel and the right roof panel;

complete rotation of the lower left wall panel and the upper left wall panel into a resting position over the left base floor panel and rotate of the lower right wall panel and upper right wall panel onto a resting position over the right base floor panel, wherein the left roof panel and the right roof panel maintain a pitch with respect to the spine panel;

simultaneously rotate upwardly the left base panel and right base floor panel, together with the panels being supported by the left base panel and right base floor panel, along the first continuous hinge, the fourth continuous hinge, and the seventh continuous hinge, towards the spine panel while the left roof panel rotates along the fifth continuous hinge and the right roof panel rotates along sixth continuous hinge towards each other under the spine panel, thereby resulting in containment therebetween of the upper left wall panel, the lower left wall panel, the left front end wall panel, the right front end wall panel, the left base floor panel, the right base floor panel, the left rear wall panel, the right rear end wall panel, the lower right wall panel, and the upper right wall panel beneath the spine panel as a compact, transportable unit.

* * * * *